United States Patent [19]

Lee et al.

[11] Patent Number: 4,956,450

[45] Date of Patent: Sep. 11, 1990

[54] PROCESS FOR FORMING END-CAPPED POLYAMIC ACIDS POLYIMIDES

[75] Inventors: Burnell Lee; Hsueh M. Li, both of Baton Rouge, La.

[73] Assignee: Ethyl Corporation, Richmond, Va.

[21] Appl. No.: 357,236

[22] Filed: May 26, 1989

[51] Int. Cl.$^5$ .......................... C08G 69/26; C08G 8/02
[52] U.S. Cl. .................................... 528/353; 528/125; 528/126; 528/128
[58] Field of Search ................ 528/353, 125, 126, 128

[56] References Cited

U.S. PATENT DOCUMENTS

| | | | |
|---|---|---|---|
| 3,179,630 | 4/1965 | Endrey | 525/436 |
| 3,179,632 | 4/1965 | Hendrix | 525/436 |
| 3,234,181 | 2/1966 | Olivier | 528/182 |
| 3,748,311 | 7/1973 | Burns et al. | 528/336 |
| 3,772,254 | 11/1973 | Jones et al. | 524/194 |
| 3,975,363 | 8/1976 | Jones | 526/259 |
| 4,173,700 | 11/1979 | Green et al. | 528/125 |
| 4,244,853 | 1/1981 | Serafini et al. | 525/432 |
| 4,552,931 | 11/1985 | St. Clair et al. | 525/432 |
| 4,742,153 | 5/1988 | Sutton, Jr. | 528/353 |

*Primary Examiner*—John Kight, III
*Assistant Examiner*—D. Hampton-Hightower
*Attorney, Agent, or Firm*—Richard J. Hammond

[57] ABSTRACT

This invention discloses a process where a portion of an amine terminated polyamic acid intermediate is end-capped with an aromatic monoanhydride additionally substituted with a free carboxylic acid or ester thereof. The polyamic acids of this invention are readily converted to high molecular weight polyimides which may contain a small amount of amide groups.

16 Claims, No Drawings

PROCESS FOR FORMING END-CAPPED POLYAMIC ACIDS POLYIMIDES

FIELD OF INVENTION

This invention relates to an improved process for preparing polyamic acids. More specifically, it relates to a process where a portion of an amine terminated polyamic acid intermediate is end capped with an aromatic monoanhydride additionally substituted with a free carboxylic acid or ester. The polyamic acids of this invention are readily converted to high molecular weight polyimides which may contain a small amount of amide groups.

BACKGROUND OF INVENTION

Linear aromatic/heterocyclic condensation polyimides have been an item of commerce for almost two decades. The polymer systems that have seen the most commercial success include those usually described as the reaction products of aromatic tetraacids or derivatives with aromatic diamines. The acids are typically employed in their dianhydride or diester form. Because of the difficulty in shaping, coating or other processing of the polyimides produced from the above starting materials, it has been found to be more convenient to first form a solution of an intermediate reactant from the starting materials. This intermediate is termed a polyamic acid. The polyimide is then formed by concurrent solvent removal and thermal imidization which typically occurs at from about 150.C. to about 300.C. A representative general reaction employed to form the linear condensation polyimides is shown below.

polyamic acid with dicarboxylated monoanhydrides. See for example U.S. 4,742,153. Thermal conversion of the end-capped polyamic acids converts these materials to polyimides through formation of an intermediate anhydride and subsequent chain extension of the end-capped polyamic acid. However, end-capped polyamic acids prepared by this process require high cure temperatures and long cure times.

SUMMARY

An improved process has now been discovered for making low viscosity, high solids solutions of polyamic acids useful for preparing polyimides having improved properties. More specifically, this invention involves forming a solution of an end-capped polyamic acid by contacting in a suitable solvent an aromatic diamine with a dianhydride of an aromatic tetracarboxylic acid and a monoanhydride of an aromatic polycarboxylic acid having one free terminal carboxylic acid or ester moiety. The resulting polyamic acid will have a free carboxylic acid or ester group. It can then be converted chemically or thermally to a polyimide at modest temperatures, i.e. above 120C. By adjusting the mole percent of monoanhydride based on diamine, the resultant polyamic acid solution will exhibit a low viscosity and the polyimide product will display substantially all of the improved properties of homopolymer imides.

The novelty of this invention resides in the preparation and use of "end-capping" agents containing one free carboxylic acid or ester derivative and the finding that this group of such end-capped polyamic acids reacts with the amine groups of the polyamic acid at moderately elevated temperatures. The end-capping is

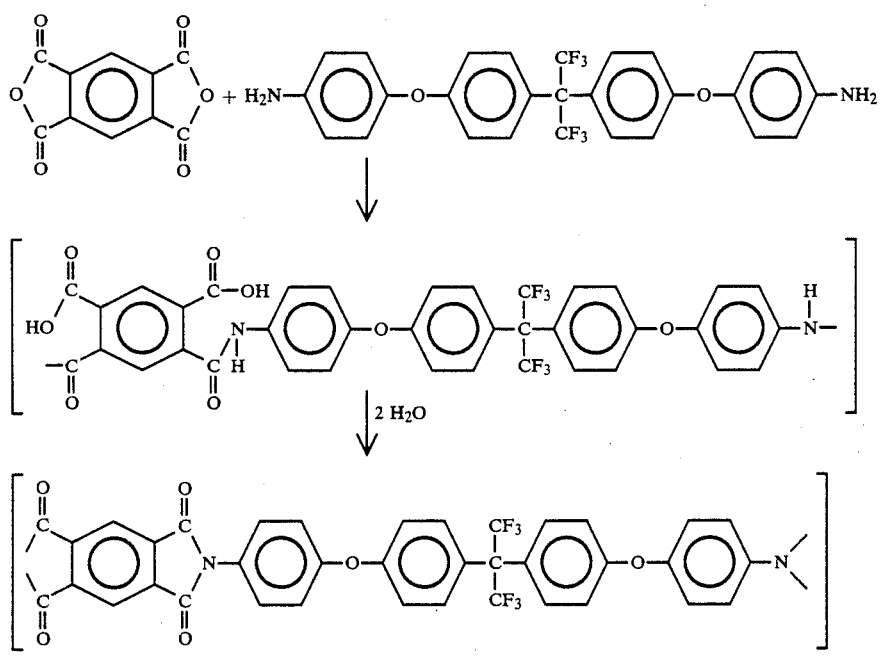

It is most cost effective to use high solids polyamic acid solutions in this process. Further, it is best to employ high molecular weight polyamic acids since the resultant polyimide products have improved properties. It has been previously known that high molecular weight polyimides can be made from low viscosity, high solids solutions of polyamic acids by carboxylating, "end-capping," the terminal amino groups of the accomplished by reacting a certain proportion of the amine groups in the diamine with the free carboxylic acid (or ester)-containing monoanhydride, as described in more detail below. By virtue of this end-capping, it is possible to keep the molecular weight of the polyamic acid temporarily at a level lower than normal. In the course of forming the polyimide and drying it, its molecular weight builds up in a final, moderately elevated temperature curing operation to give a polymer with properties equivalent to those for polymers made from a non-end-capped polyamic acid intermediate.

An advantage of this new process is that it allows preparation of easily processible high solids polyamic acids, i.e., polyamic acid solutions having lower viscosity than solutions prepared from non-end-capped polyamic acids. These improved materials can provide solutions of substantially the same or lower viscosity as polyamic acid solutions prepared from non-end-capped polyamic acids but at higher solids contents. This allows for substantial savings in manufacturing and solvent cost.

The monoanhydrides used in the practice of this invention may be represented by the general formula

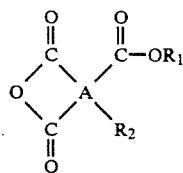

wherein A is a polyvalent aromatic group. The polyvalent aromatic group A is preferably one having one of the following structures:

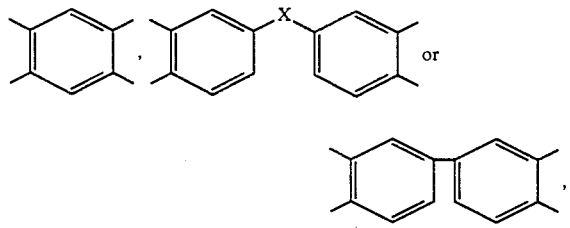

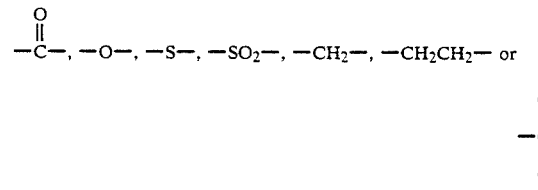

and $R_1$ is hydrogen, $C_1$ to $C_6$ linear or branched alkyl, $C_5$ to $C_8$ cycloalkyl, or substituted or unsubstituted aryl, $R_2$ is hydrogen, halo, $C_1$ to $C_6$ linear or branched alkyl, $C_1$ to $C_6$ linear or branched alkoxy or substituted or unsubstituted aryl and X is at least one of the following:

$$-\overset{O}{\underset{\|}{C}}-,\ -O-,\ -S-,\ -SO_2-,\ -CH_2-,\ -CH_2CH_2-\ \text{or}$$

$$-\underset{\underset{CF_3}{|}}{\overset{\overset{CF_3}{|}}{C}}-$$

When $R_1$ or $R_2$ is $C_1$ to $C_6$ linear or branched alkyl, the preferable groups include methyl, ethyl, n-propyl, n-butyl and the like. In cases where $R_2$ is alkoxy it is preferred that such groups include methoxy, ethoxy, propoxy, 1-butoxy and the like.

Where $R_2$ is halo it is preferred that such be chloro.

For either $R_1$ or $R_2$ when the term "substituted or unsubstituted aryl" is used it is preferred such include phenyl, halophenyl and the like.

The following monoanhydrides are preferably used in the practice of this invention:
methyl ester of trimellitic anhydride
ethyl ester of trimellitic anhydride
tert-butyl ester of trimellitic anhydride
n-propyl ester of trimellitic anhydride
isopropyl ester of trimellitic anhydride
phenyl ester of trimellitic anhydride Suitable dianhydrides include those corresponding to the monoanhydrides shown above, i.e. having the nucleus A but bearing two anhydride functions. These can be illustrated by the following: pyromellitic dianhydride; 2,3,6,7-naphthalene tetracarboxylic dianhydride; 3,3',4,4'-biphenyltetracarboxylic dianhydride; 1,2,5,6-naphthalenetetracarboxylic dianhydride; 2,2',3,3'-biphenyltetracarboxylic dianhydride; 3,3',4,4'-benzo phenonetetracarboxylic dianhydride; 2,2-bis(3,4-dicarboxyphenyl)propane dianhydride; bis(3,4-dicarboxyphenyl)sulfone dianhydride; 3,4,9,10-perylenetetracarboxylic dianhydride; bis(3,4-dicarboxyphenyl)propane dianhydride; 1,1-bis(2,3-dicarboxyphenyl)ethane dianhydride; 1,1-bis(3,4-dicarboxyphenyl)ethane dianhydride; bis(2,3-dicarboxyphenyl)methane dianhydride; bis(3,4-dicarboxyphenyl)methane dianhydride; bis(3,4-dicarboxyphenyl)sulfone dianhydride; 2,2-bis(3,4-dicarboxypheny)hexafluoropropane dianhydride; and the like.

Suitable diamines include those of the formula $H_2N-R-NH_2$ where R is a divalent benzenoid radical selected from the group consisting of:

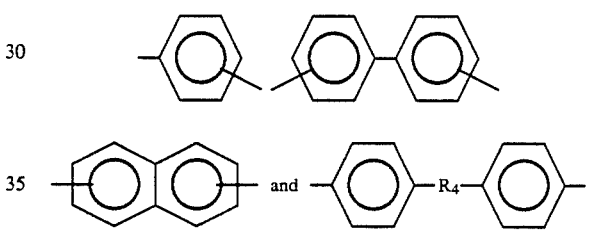

$R_4$ is selected from the group consisting of optionally substituted (e.g., with alkyl or haloalkyl) alkylene chain having 1 to 3 carbon atoms, substituted or unsubstituted aryl, $-O-$, $-S-$, $-SO_2-$,

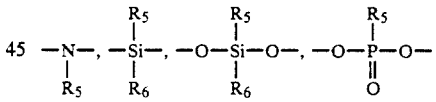

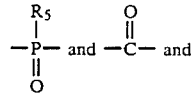

$R_5$ and $R_6$ are selected from the group consisting of $C_1$ to $C_6$ linear or branched alkyl and substituted or unsubstituted aryl.

Particularly preferred diamines are 2,2-bis[4-(4-aminophenoxy)phenyl]hexafluoropropane (4-BDAF) and 2,2-bis[4-(3aminophenoxy)phenyl]hexafluoropropane (3-BDAF).

Because the polyamic acids of this invention find particular use as intermediates for preparation of polyimides, it is desirable to produce such intermediates with as little free carboxylic acid or carboxylic acid ester as end-capping agent. However, when concentrations of such end-capping agent are reduced past a critical point then the resulting intermediate polyamic acids loses their desirable processing properties, i.e., low viscosity at high solids content solutions. Thus, when the mole percent of the monoanhydride of this invention is 2 mole % or less based on mole % of aromatic diamine, then the resulting polyamic acid made from reacting the diamine with the combination of dianhydride and monoanhydride produces undesirable processing properties. Similarly amounts of monoanhydride exceeding 10 mole percent also cause undesirable changes in the polyamic acid and resulting polyimide physical properties. A preferred range for such end-capping agent is above 2.0 to about 5.0 mole % most preferably 2.5 to 4.5 mole % based on the aromatic diamine. It should be understood however mole ratios of aromatic diamine to the combination of dianhydride plus monoanhydride should be about 1:1.

Solvents suitable for use in this invention are dipolar aprotic solvents such as those of the N,N-dialkylcarboxylamide class. Preferred solvents include the lower molecular weight members of such carboxylamides, particularly, N,N-dimethylformamide and N,N-dimethylacetamide. Other useful compounds of this class of solvents are N,N-diethylformamide and N,N-diethylacetamide. Other solvents which may be used in the present invention are dimethylsulfoxide, N-methyl-2-pyrrolidone, tetramethyl urea, dimethylsulfone, hexamethylphosphoramide, tetramethylene sulfone, and the like. The solvents can be used alone, in combinations of solvents, or in combinations with poor solvents such as benzene, benzonitrile, dioxane, etc.

To prepare the polyamic acids of this invention several different procedures may be used. A particularly desirable procedure, especially when conducting the process on the laboratory scale, is to form an essentially equimolar mixture of for example (a) 4-BDAF (2,2-bis[4-(4-aminophenoxy)phenyl]hexafluoropropane) and/or 3-BDAF (2,2-bis[4-(3-aminophenoxy)phenyl]hexafluoropropane) with (b) a dianhydride of an aromatic tetracarboxylic acid or any mixture of dianhydrides of two or more tetracarboxylic acids and a monoanhydride of an aromatic polycarboxylic acid having one free carboxylic acid group or ester derivative thereof in an excess quantity of the solvent, preferably a solvent containing at least 10% by weight of a dipolar aprotic solvent. The molar concentration of the monoanhydride in these reactions should be greater than 2.0 mole % of the diamine but should not exceed 10 mole %. In any such procedure care should be taken to avoid exposure of the reactants to excessive heat as this could result in premature polyimide formation, which is undesirable.

Conversion of the end-capped polyamic acid to polyimide is accomplished by a thermal conversion process. Usually, this is a two-step process, the first step of which involves heating the polyamic acid at a temperature of above about 50° C. and below about 150° C. to remove most of the solvent. The second step involves heating the polyamic acid to a higher temperature (e.g., at least about 220° C.). At or above about 220° C., conversion of polyamic acid to polyimide is completed and chain extension (occurring as a result of carboxylic acid or ester group reaction with free amino groups) occurs. It is believed that chain extension occurs almost immediately at this temperature, so holding the composition at this temperature for as short a period of about 10 minutes to about 60 minutes at 300–°350.C. should be sufficient. The process of this invention is further illustrated by the following examples.

EXAMPLE 1 (GENERAL PROCEDURE)

A solution of 2,2-bis[4-(4-aminophenoxy)phenyl]hexafluoropropane (4-BDAF) is dissolved in N-methyl-2-pyrrolidone (NMP) and heated under nitrogen to about 70.C before adding an equimolar amount of pyromellitic dianhydride (PMDA) or benzophenonetetracarboxylic dianhydride (BTDA) and trimellitic anhydride (TMA). When addition is complete, the reaction mixture is stirred at about 80° C. for approximately two hours.

EXAMPLES 2 and 3

Following the general procedure illustrated in Example 1, the following polyamic acid preparations are made:

TABLE I

| | End-Capped Polyamic Acids | |
|---|---|---|
| Example No. | 2 | 3 Comparative |
| 4-BDAF$^A$ | 18.60 g | 18.60 g |
| 6-FDA$^B$ | 15.08 g | 15.67 g |
| TMA$^C$ | 0.27 g | — |
| Mole % TMA$^D$ | 3.8 mole % | — |
| NMP$^E$ | 45.52 g | 48.05 g |
| (NMP rinse) | (10.00 g) | (9.72 g) |
| CH$^F$ | 60.01 g | 57.75 g |
| $\eta$inh$^G$ | 0.45 dL/g | 0.82 dL/g |
| Bulk viscosity$^H$ | 826 cp | 7,900 cp |

$^A$99.9 wt % pure
$^B$2,2-bis(3,4-dicarboxyphenyl) hexafluoropropane dianhydride contained 1.6 wt % 2,2-bis(3,4-dicarboxyphenyl) hexafluoro-propane monoanhydride as received
$^C$Contained 3 wt % trimellitic acid
$^D$Relative to moles 4-BDAF
$^E$N-methyl-2-pyrrolidone, contained trace amounts of water
$^F$Cyclohexanone, contained trace amounts of water
$^G$Conc. = 0.5 g/dL in NMP
$^H$Cone/plate method at 25° C.

TABLE II

| | End-Capped Polyamic Acids |
|---|---|
| Example No. | 4 |
| 4-BDAF solution$^A$ | 1437.11 g |
| PMDA$^B$ | 156.33 g |
| PMDA from 5 wt. % NMP solution | 2.58 |
| TMA$^C$ | 3.89 g |
| Mole % TMA$^D$ | 2.6 mole % |
| NMP Rinses | 292.77 g |
| | 279.76 g |
| $\eta$inh$^E$ | 0.87 dL/g |
| Bulk viscosity$^F$ | 36,600 cp |

$^A$26.94 wt % 4-BDAF (99.9 wt % pure) in NMP
$^B$Pyromellitic dianhydride contained 0.39 wt % pyromellitic monoanhydride (PMMA) after heat treatment at 190° C.
$^C$Contained 3 wt % trimellitic acid
$^D$Relative to moles 4-BDAF
$^E$Conc. = 0.5 g/dL in NMP
$^F$Cone/plate method at 25° C.

EXAMPLES 5 AND 6

TABLE III

| | End-Capped Polyamic Acids | |
|---|---|---|
| Example No. | 5 | 6 |
| 4-BDAF$^A$ solution | 1512.39 g | 1516.10 g |
| BTDA$^B$ | 242.93 g | 240.19 g |
| BTDA from 5 wt % NMP solution | 2.69 g | 3.53 g |
| TMA$^C$ | 4.95 g | 6.35 g |
| Mole % TMA$^D$ | 3.1 mole % | 4.1 mole % |
| NMP Rinses | 199.80 g | 195.73 g |
| | 199.79 g | 195.62 g |

TABLE III-continued

| | End-Capped Polyamic Acids | |
|---|---|---|
| Example No. | 5 | 6 |
| $\eta inh^E$ | 0.89 dl/g | 0.72 dl/g |
| Bulk viscosity$^F$ | 190,900 cp | 75,500 cp |

[A]See Table II
[B]3,3',4,4'-benzophenonetetracarboxylic dianhydride; contained 0.55 weight percent 3,3',4,4'-benzophenonetetracarboxylic monoanhydride (BTMA)
[C]See Table I
[D]See Table I
[E]Conc. = 0.5 g/dL in NMP
[F]Cone/plate method at 25° C.

TABLE IV

| Example | Isothermal TGA Wt. Loss$^A$ | Decomposition$^B$ Temperature °C. | 10% Wt. Loss$^B$ Temperature °C. | Adhesion$^C$ |
|---|---|---|---|---|
| From Table I | | | | |
| 2 | 0.5 | 557 | 549 | — |
| Comparative Ex. 3$^D$ | 0.7 | 543 | 557 | 100% |
| Comparative E | 1.4 | — | — | 100% |
| From Table II | | | | |
| 4 | 0.5 | 545 | 568 | 100% |
| Comparative$^E$ | 0.3 | 528 | 548 | 100% |
| From Table III | | | | |
| 5 | 1.0 | 527 | 558 | — |
| 6 | 0.2 | 529 | 553 | 100% |
| Comparative$^F$ | 0.7 | 535 | 562 | 100% |

[A]TGA at 400° C., nitrogen, 1 hour.
[B]TGA, RT-700° C., 10° C./min.
[C]Cross-hatch with tape peel.
[D]No end-capping agent added.
[E]Prepared with no TMA present; the PMDA used contained 3.0 mole percent PMMA.
[F]Prepared with no TMA; the BTDA used contained 1.0 mole percent BTMA.

TABLE V

| Inherent Viscosities ($\eta inh$) Polyamic acids And Corresponding Polyimides | | |
|---|---|---|
| Example No. | 2 | 3 |
| Mole % TMA$^A$ | 3.8 mole % | — |
| $\eta inh$ of polyamic-acid | 0.45 dL/g | 0.82 dL/g |
| $\eta inh$ of poly(amide-imide)$^B$ | 0.52 dL/g | 0.75 dL/g$^C$ |

[A]Relative to moles of 4-BDAF
[B]The prepared thermal conversion process illustrated in this Table involves raising the temperature of the polyamic acid solutions of Examples 2 and 3 to about 120° C. to 160° C. in stages (preferably, over a period of about 5 to 60 minutes) followed by heating above 220° C. (preferably, about 300° to 350° C.) for a period up to about one hour.
[C]Polyimide homopolymer comparison.

We claim:

1. A process for preparing a polyamic acid comprising contacting a solution of an aromatic diamine in a suitable solvent with a dianhydride of an aromatic tetracarboxylic acid and a monoanhydride of an aromatic polycarboxylic acid having one free carboxylic acid or esters thereof, said monoanhydride being at least greater than 2.0 mole percent of said diamine and the total mole ratio of said aromatic diamine to said dianhydride and monohydride being about 1:1.

2. The process of claim 1 wherein said aromatic diamine is selected from the group 2,2-bis[4-(4-aminophenoxy)phenyl]hexafluoropropane, 2,2-bis[4-(3-aminophenoxy)phenyl]hexafluoropropane and mixtures thereof.

3. The process of claim 1 wherein said dianhydride of an aromatic tetracarboxylic acid is selected from the group 2,2-bis(3,4-dicarboxyphenyl)hexafluoropropane dianhydride, pyromellitic dianhydride, 3,3',4,4'-benzophenone tetracarboxylic acid dianhydride and mixtures thereof.

4. The process of claim 1 wherein said monoanhydride of an aromatic polycarboxylic acid is

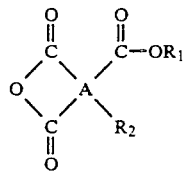

where A is

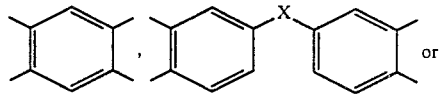

or

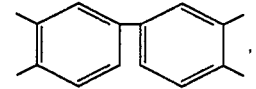

$R_1$ is hydrogen, $C_1$ to $C_6$ linear or branched alkyl, $C_5$ to $C_8$ cycloalkyl, or substituted or unsubstituted aryl, $R_2$ is hydrogen, halo, $C_1$ to $C_6$ linear or branched alkyl, $C_1$ to $C_6$ linear or branched alkoxy or substituted or unsubstituted aryl and X is at least one of

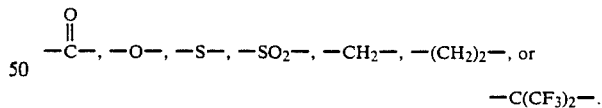

5. The process of claim 4 wherein $R_1$ is hydrogen.

6. The process of claim 5 wherein $R_1$ is alkyl selected from the group methyl, ethyl and n-propyl.

7. The process of claim 5 wherein $R_2$ is hydrogen.

8. The process of claim 7 wherein said aromatic diamine is 2,2-bis[4-(4-aminophenoxy)phenyl]hexafluoropropane.

9. A process for forming a polyimide comprising contacting a solution of an aromatic diamine in a suitable solvent with a dianhydride of an aromatic tetracarboxylic acid and a monoanhydride of an aromatic polycarboxylic acid having one free carboxylic acid or esters thereof said monoanhydride being at least greater than 2.0 mole percent of said diamine and the total mole ratio of said aromatic diamine to said dianhydride and monoanhydride being about 1:1; and heating the resulting mixture at a temperature sufficient to remove the solvent and form the polyimide.

10. The process of claim 9 wherein said aromatic diamine is selected from the group 2,2-bis[4-(4-aminophenoxy)phenyl]hexafluoropropane, 2,2-bis[4-(3-aminophenoxy)phenyl]hexafluoropropane and mixtures thereof.

11. The process of claim 9 wherein said dianhydride of an aromatic tetracarboxylic acid is selected from the group 2,2-bis(3,4-dicarboxyphenyl)hexafluoropropane dianhydride, pyromellitic dianhydride, 3,3',4,4'-benzophenonetetracarboxylic acid dianhydride and mixtures thereof.

12. The process of claim 9 wherein said monoanhydride of an aromatic polycarboxylic acid is

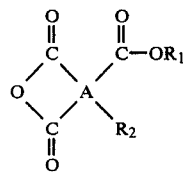

where A is

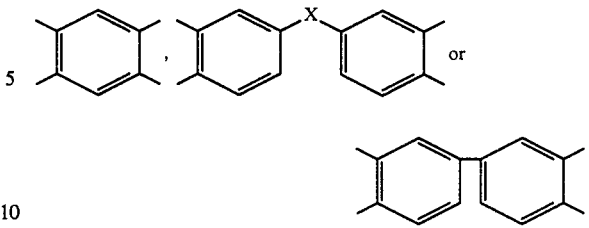

$R_1$ is hydrogen, $C_1$ to $C_6$ linear or branched alkyl, $C_5$ to $C_8$ cycloalkyl, or substituted or unsubstituted aryl, $R_2$ is hydrogen, halo, $C_1$ to $C_6$ linear or branched alkyl, $C_1$ to $C_6$ linear or branched alkoxy or substituted or unsubstituted aryl and X is at least one of

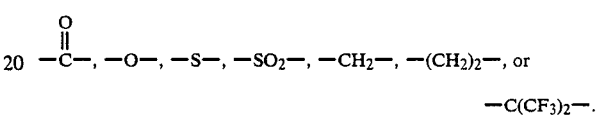

13. The process of claim 12 herein $R_1$ is hydrogen.
14. The process of claim 12 wherein $R_1$ is a lower alkyl selected from the group methyl, ethyl and n-propyl.
15. The process of claim 14 wherein $R_2$ is hydrogen.
16. The process of claim 15 wherein said aromatic diamine is 2,2-bis[4-(4-aminophenoxy)phenyl]hexafluoropropane.

* * * * *